Figure 3:

Feb. 9, 1937.  W. D. SHIELDS  2,070,320
EXTENSOMETER
Filed Sept. 12, 1935   2 Sheets-Sheet 1
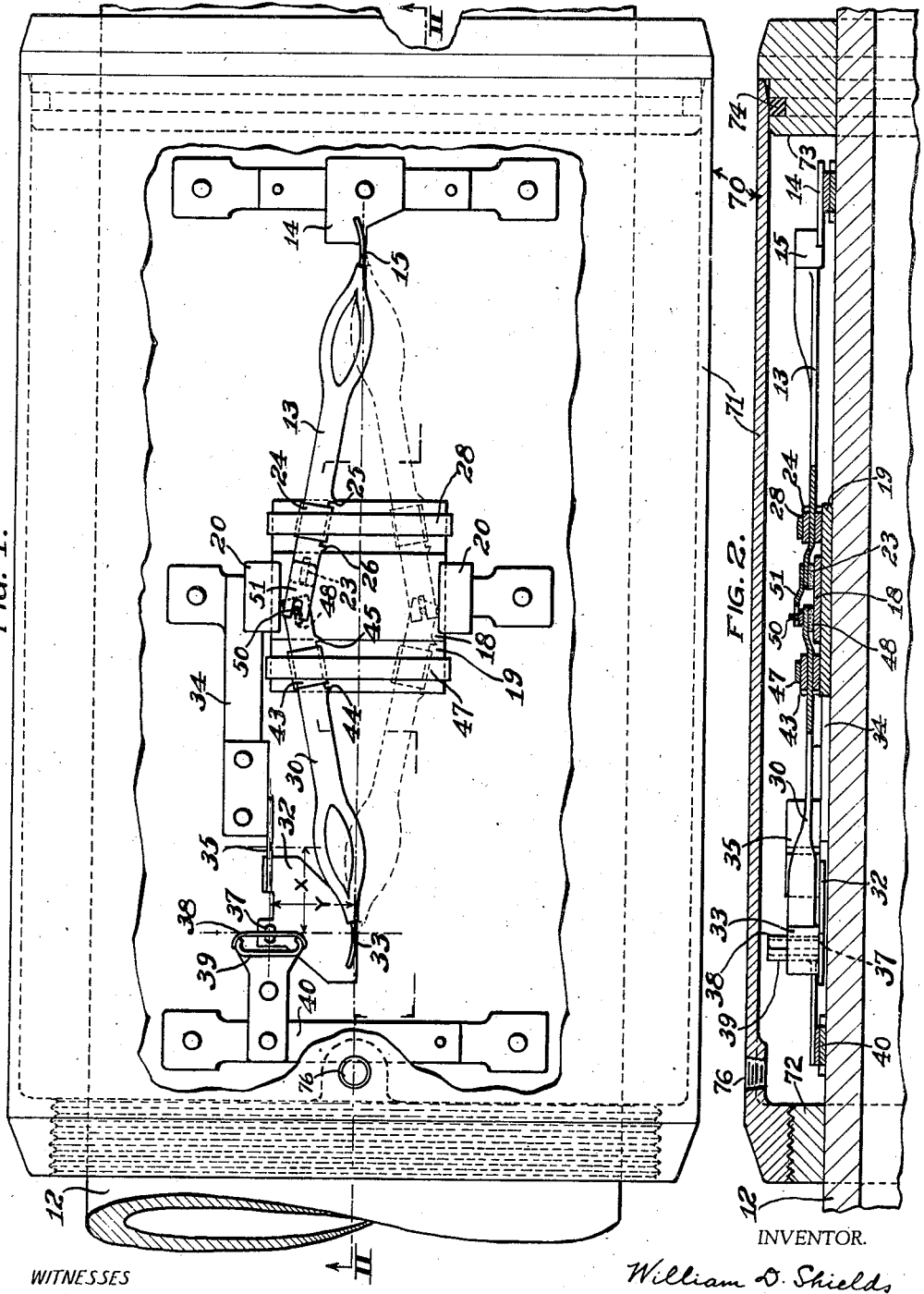
WITNESSES
A B Wallace
A H Oldham
INVENTOR.
William D. Shields
BY Brown, Critchlow & Flick
his ATTORNEYS.

Feb. 9, 1937.  W. D. SHIELDS  2,070,320

EXTENSOMETER

Filed Sept. 12, 1935   2 Sheets-Sheet 2

TENSION | COMPRESSION

WITNESSES
A. B. Wallace
A. H. Oldham

INVENTOR.
William D. Shields
BY Brown, Critchlow & Flick
his ATTORNEYS.

Patented Feb. 9, 1937

2,070,320

UNITED STATES PATENT OFFICE 2,070,320

EXTENSOMETER

William D. Shields, Edgeworth, Pa., assignor to Spang, Chalfant & Company, Inc., Pittsburgh, Pa., a corporation of Pennsylvania Application September 12, 1935, Serial No. 40,306

3 Claims. (Cl. 234—1)

This invention relates to extensometers, and more particularly to recording instruments of this character which are adapted to be secured directly to the article to measure the strains therein under operating conditions.

Heretofore considerable difficulty has been experienced in providing an extensometer of the type specified which can be employed to record a relatively long series of strains in an article in use, for example, to measure and record the stresses to which a rotary drill pipe is subjected when drilling an oil well or the like. The failure of prior devices has been due to various causes which include: the lack of ability of the instrument to withstand shock and pounding as encountered by the article in use, while being sufficiently sensitive to accurately record the strains; limitations as to size and movements of parts; permanency of record, etc. However, probably the chief trouble has been that the recording means has not been able to record the strains over a sufficient time period to provide a worthwhile record thereof. The words "stress" and "strain" as employed herein should be distinguished, as by "strain" is meant the distortion or change in shape or volume of an article when subjected to one or more forces called a "stress" or "stresses."

Particularly it is the object of the present invention to provide a recording extensometer which is applied directly to the article or member to remain thereon when in use under usual conditions including pounding and shock with the extensometer operating to record strains over a considerable time period.

Another object of the present invention is to provide an extensometer of the recording type which is adapted to record only strains above a predetermined minimum.

Another object of the invention is the provision of a recording extensometer which is particularly adapted for use in measuring with engraved record the strains to which drill pipe or the like is subjected when in use.

Another object of the invention is to provide an extensometer which is delicate and accurate and yet rugged and long-lived in service, and which can be operated by the ordinary workmen in the field with proper supervision.

Another object of the invention is to provide a recording extensometer which measures both torsion and axial strains simultaneously.

The foregoing and other objects of the invention are achieved by the provision of an instrument which comprises a combined tension-compression unit and a torsion unit so coordinated as to record over relatively long periods an indication of the strains on a member tested. More specifically the tension-compression unit includes an arcuately movable finger and an element for recording movement of the finger. The torsion unit comprises an arcuately movable finger, which for convenience is here referred to as an arm, likewise recording on the same or an associated element with means coordinating the movements of the finger and arm. The units are preferably provided with means for substantially damping out the recording of strains below desired magnitudes. These damping means include sleeves mounted for limited sliding movement relative to the finger and arm with frictional means for holding the sleeves stationary relative to the record receiving element within the limits of the sliding movement of the sleeves relative to the finger and arm. Further means are provided which tend to swing the finger and arm across the element when the sleeves are moved radially with the finger or arm due to strains on the article beyond a predetermined magnitude. Thus the strains beyond a certain range cause the finger or arm to slide axially through the sleeves to the limit of their movements therein at which time the sleeves are picked up and moved axially with the finger or arm. Axial movements of the sleeves also result in arcuate movement of the sleeves and finger or arm over the frictional means because of the influence of the means tending to swing the finger and arm about their supports. Thus a series of strains beyond desired limits causes a graph or chart to be scratched on the record receiving element.

Figure 8:
Figure 9:
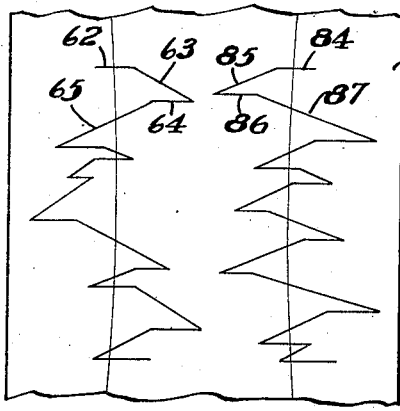
Figure 10:
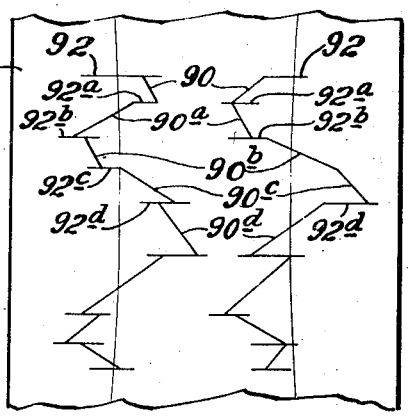

In the drawings, Fig. 1 is a plan view of an extensometer incorporating the features of the present invention showing it mounted on a drill pipe which is largely broken away. Fig. 2 is a radial longitudinal cross-sectional view taken on line II—II of Fig. 1 and illustrating the extensometer partly in elevation; Figs. 3 to 8 show one of the extensometer fingers or arms and its associated sleeve in various positions as encountered in use; Fig. 9 shows diagrammatically a typical record made by the extensometer with the units operating independently; and Fig. 10 is a typical record with the units coordinated.

The instrument of the present invention is adapted to be used in various relations where it is desirable to record the strains in a member or the stresses applied thereto while actually in use in a structure, machine or assembly. However, since the extensometer of the present invention is particularly adapted to be employed in conjunction with a rotary drill pipe such as used for drilling oil wells to great depth, it has been illustrated in conjunction therewith and will be so described.

Referring to Figs. 1 and 2 of the drawings, the numeral 12 indicates a drill pipe of any known or standard design which is to be tested in use. The extensometer proper comprises a unit adapted to measure axial or tension and compression strains and a second unit adapted to measure torsional or twisting strains. The unit for measuring tension and compression strains includes a finger 13 which is adapted to be swingably secured to the pipe 12 for arcuate movement over the surface of the pipe. It is also essential to resiliently urge the finger 13 to one side of its arcuate movement as hereafter more fully explained. The swinging mounting of the finger as well as the resilient urging of the finger in arcuate movement is effected, in the form of the invention shown, by providing a bracket or base 14 which is soldered or otherwise secured to the pipe with a spring 15 securing the finger 13 to the base 14.

Positioned below the finger 13 approximately near the unsupported end thereof is a record receiving element 18, preferably formed with a chromium surface, and the element is removably secured to the pipe 12 in any desired manner. This is preferably accomplished by providing a bed or table 19 having clips 20 which releasably receive the element 18. Scratching means, such as emery paper 23, is secured to the under side of the finger 13 over the element 18 so that movement of the finger across the element results in the scratching of a record thereon. While the emery paper generally makes several lines, they all are quite fine with certain lines predominating so that the record can be easily read upon magnification.

Near the unsupported end of finger 13 and preferably above the table 19 the finger is provided with a sleeve 24, or like member, which has sliding movement relative to the finger as limited by abutments 25 and 26. In ordinary practice the extensometer parts are so small that adjustment of the abutments 25 and 26 toward and from each other to control the magnitude of strains actually recorded is not practical. As a result the same purpose is generally achieved by changing the length of the sleeve 24 as by filing to the exact length to leave the required clearance between the ends of the sleeve and the abutments, or by providing assorted sleeves with varying predetermined clearances. As hereafter explained the greater the clearance is the greater the figure below which the strains are not recorded. The table 19 is provided with means which frictionally engage with the sleeve 24, and these means in the form of the invention illustrated comprise a bar 28 secured at its ends to the table 19 and frictionally engaging with the top of the sleeve 24, as shown in Fig. 2, to hold the bottom of the sleeve against the upper surface of the table 19.

The unit for measuring torsional strains comprises an arm or finger 30 which is swingably secured to the pipe for arcuate movement across the pipe above the element 18. Means are also provided for resiliently urging the arm arcuately over the element. In the form of the invention illustrated the arm 30 is both swingably mounted and resiliently urged in an arc through the provision of a bracket 32 which carries the arm 30 on a spring 33. The bracket 32 is swingably secured to the pipe 12 so that tension and compression strains do not move it angularly but so that torsional strains cause it to swing in an arc.

The desired mounting may be obtained by the means shown in Figs. 1 and 2 which include an extension 34 of the table 19 secured by spring 35 to one corner of the bracket 32. An axially spaced corner of the bracket is pivotally secured by a pin 37 to a flexible metal strip 38 which might be said to form the bowstring of a relatively rigid bow 39 secured to a bracket or base 40 which is fastened by soldering, for example, to the pipe 12. The base 40 and the base 14 should be mounted so that the pivotal centers of the springs carrying the arm 30 and finger 13 are in axial alignment as shown by the dot and dash line connecting these centers. Likewise the pivotal point of the spring 33, the pin 37 and the pivotal point of the spring 35 are preferably at right angles to each other with the distance Y between the first two of these points preferably equaling the distance X between the second two of these points. The pin 37 should be in axial alignment with the spring 35 as indicated by a dot and dash line.

The arm 30, like finger 13, is provided near its unsupported end with a slidable member such as a sleeve 43, whose movement on the arm is limited by shoulders 44 and 45. The clearance between the ends of the sleeve 43 and the shoulders 44 and 45 can be changed as above described in conjunction with finger 13 as will be understood. Normally holding the sleeve against movement are frictional means which may comprise a bar 47 secured at its ends to the table 19 and contacting with the top of the sleeve to hold it in frictional engagement between the table and the bar.

The end of the arm 30 extends above the element 18 and is provided with recording means such as emery paper 48. The element 18 is made wide enough to record both the movements of the finger 13 and the arm 30. Two separate record receiving elements may be employed but this is not the preferred practice.

A novel feature of the invention resides in coordinating the movement of the finger 13 and arm 30. In the embodiment of the invention illustrated in the drawings, coordination is achieved by securing a pin 50 to the end of the arm 30 and a fork 51 to the end of the finger 13 with the fork 51 fitting slidably over the pin 50.

The entire extensometer as described is preferably enclosed in a cover or housing shown generally at 70 which may comprise a sleeve 71 and collars 72 and 73 which are shrunk, welded, or otherwise secured on the pipe 12. The collar 73 includes a gasket 74 so that the sleeve 71 sliding over the collar 73 is in substantially fluid-tight relation therewith. The collar 72 is threaded on its outer periphery and engages with a complementary thread formed on the inside of the smaller end of the sleeve 71. This construction allows the sleeve to be readily removed or secured in place. In order to prevent the sleeve from collapsing due to high external pressures, as when the pipe is deep in a well, it is filled with a fluid such as lubricating oil which operates also to lubricate and dampen the movement of the extensometer parts. The sleeve 71 is provided with one or more plugs 76 to facilitate the introduction of oil into the housing 70.

Figure 4:
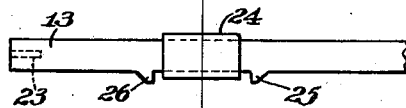
Figure 5:
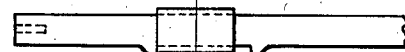

The operation of the extensometer will now be described. With the base 14, the table 19, and the base 40 of the extensometer secured in spaced relation on the drill pipe, an unmarked element 18 is placed in the clips 20 and the finger 13 and arm 30 are placed in the full-line position shown in Fig. 1. In this position the springs 15 and 33 are constantly tending to move the finger 13 and arm 30 arcuately to the dotted position shown in the same figure. The arcuate movements of the finger 13 and arm 30 are, however, normally prevented by the static friction existing between the sleeves 24 and 43 and the bars 28 and 47 and table 19 engaging with the sleeves. However, as the drill pipe is operated it is subjected to severe strains which cause movement of the arm 30 and finger 13. The results of tension and compression forces will be described first as effecting this movement, and in order to simplify the explanation of the operation, the unit will be described as operating alone. Tension and compression stresses on the pipe cause the bed 14 and the table 19 to move closer together under compression and farther apart under tension. So long as the resulting strains are within the predetermined limits, for example approximately one-half of the maximum stress to which the drill pipe can be subjected, the finger 13 moves axially in the sleeve 24 without the abutments 25 and 26 engaging with the ends of the sleeve. This movement is shown in Figs. 3, 4, and 5 and results only in a scratch 84 on the record receiving element 18 as seen in Fig. 9.

Figure 6:
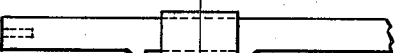

However, when these predetermined limits are exceeded, for example, in compression, the abutment 25 on the finger 13 engages with the end of the sleeve 24 and moves the sleeve, as shown in Fig. 6. Assuming the unit is operating independently, once the sleeve 24 has started to move and the forces of static friction are overcome, the tendency of the spring 15 to swing the finger 13 in an arc causes the finger to move through an arc so long as the sleeve is being carried toward the record element by the compression force. Thereby the emery paper scratching means 23 on the end of the finger makes a diagonal scratch or record 85 on the element 18 as seen in Fig. 9. It should be understood that the finger 13 does not swing in a true arc but that the movement over the recording element of the scratching means 23 is a combination of the arcuate finger movement with the pivot center of the finger and the recording element moving closer together under the compression strain.

Figure 7:
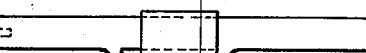

Assuming now that the compression strains on the drill pipe change to tension strains, the finger 13 slides through the sleeve 24 from the position shown in Fig. 6 to the position shown in Fig. 7. At this time the scratching means 23 makes scratch 86 shown in Fig. 9. Tension forces of increased magnitude cause the table 19 and the bed 14 to move farther apart, and the abutment 26 on the finger picks up and moves the sleeve 24, as shown in Fig. 8. Again the static frictional forces holding the sleeve 24 and its associated finger against arcuate movement are overcome, when the unit is operating independently, and a combined arcuate and longitudinal movement of the finger and sleeve is effected by the spring 15. Thus a scratch or line 87 is formed on the element 18 as best seen in Fig. 9.

Continued operation of the drill pipe subjects it to tensional and compression strains of greater and less magnitude. However, so long as these strains are below predetermined minimums which have been determined by the distance between abutments 25 and 26, they ordinarily cause no arcuate movement of the finger 13, it merely sliding back and forth in the sleeve 24 with the scratching means 23 making lines similar to 84 or 86 shown in Fig. 9 and above described. However, when extra-severe tensional or compressional strains occur, the arcuate movement of the finger is resumed as heretofore explained so that in any given run over a period of time a record or graph is scratched on the element 18 such as shown in Fig. 9.

The independent operation of the torsion unit in many respects is quite similar to that of the tension-compression unit just described. It is important to note, however, that the tension and compression stresses do not tend to move the torsion arm 30 other than through its connection with the finger 13. This is because the bracket 32 is secured at one end to the strip bowstring 38 so that movement of the base 40 toward or from the extension 34 of the table 19 does not arcuately move the bracket 32 as the bowstring 38 moves in or out of the bow 39.

However, torsional stresses and the resulting torsional strains on the pipe 12 cause a relative twisting or rotary movement of the extension 34 and the base 40 with the result that the bracket 32 swings on an arc about the pivot spring 35 and pivot pin 37 with the bowstring strip 38 yielding to allow this movement. Arcuate movement of the bracket 32 causes longitudinal or axial movement of the arm 30 and it slides in the sleeve 43 within the limits of the shoulders 44 and 45. This sliding movement causes a line 62 to be recorded on the record receiving element which as seen in Fig. 9 is similar to line 84. Torsional strains of still greater magnitude cause the shoulder 45 to engage with and pick up the sleeve 43. Assuming the torsion unit is operating independently, once the static friction holding the sleeve 43 stationary is overcome, and the sleeve is moving as just described, the tension of spring 33 tending to arcuately swing the arm 30 causes the arm to move in a short arc. This movement is recorded on the element 18 by the line 63. Reversal of the direction of torsional strain causes the arm 30 to first slide in the sleeve 43 to form line 64 and then to pick up the sleeve 43 by the shoulder 45 which overcomes the static friction so that the arm swings arcuately under the influence of spring 33 to form line 65. It should be understood that the lines 63 and 65 are not true arcs but that arm 30 moves like finger 13 heretofore described.

Continued strains of opposite and varying amounts are recorded on the element as shown in Fig. 9. Stresses below predetermined minimums are not recorded except for the lines 62 and 64, as above described.

While for the sake of simplicity the tension-compression unit and the torsion unit have been described as operating independently an important feature of the invention is to coordinate their movements by connecting the finger 13 and arm 30 with the pin and fork connection heretofore described. This connection causes the instrument to operate somewhat differently than just explained since the finger 13 and arm 30 must move together. In other words, there must be simultaneous strains of torsion which pick up the sleeve 43 and strains of tension-compression which pick up the sleeve 24. When the static friction of both sleeves is overcome at the same time then arcuate recording movement of the finger and arm occurs. These arcuate movements together with the maximum non-simultaneous strains of torsion alone or tension-compression alone are recorded on the element 18 to form a record of the type shown in Fig. 10. In this figure of the drawings the slanted lines 90, 90a, 90b, etc. represent simultaneous strains while the horizontal lines 92, 92a, 92b, etc. indicate non-simultaneous strains.

Since in a drill pipe and many other bodies failure in service is most often due to simultaneous strains of tension and torsion, the importance of an instrument for recording these strains will be evident.

In actual use the record receiving element is removed from the extensometer when the drill pipe is raised at certain intervals to change bits or the like, and microscopic photographs are taken thereof so that in accordance with known constants and formulas the critical stresses per square inch on the drill pipe can readily be determined as well as the number of times that these stresses recur. To obtain an indication of the time interval the drill may be set down hard on the bottom of the well at the start of a run and periodically during the run. This causes a strain in compression which is recorded on the element as heretofore described.

When the combined tension-compression unit and the torsion unit are employed together to record simultaneous strains it becomes of paramount importance to properly correlate and interpret the records stratched on the element 18. Ordinarily this is done by providing calibrating means simulating the coordinated movement of the arm 30 and finger 13 with the calibrating means being relatively larger than the arm and finger by the same degree that the element is magnified. Thus if the element has been magnified 200 times in the microphotographs the calibrating means is 200 times larger than the arm and finger. It should be understood that once the calibrating means has been made that the microphotographs are all enlarged to the proper degree to fit thereon.

The calibrating means may comprise carriages riding on spaced apart oppositely curved tracks 200 times larger than the arcuate movements of the finger and arm. The carriages are synchronized in their movement in the same way as the finger and arm and are provided with adjustable pointers which are initially positioned over the starting points of each graph on the magnified photograph of the element. Thus to determine the corresponding readings at any point on the graphs the carriages are moved together so as to bring the pointer carried by one carriage over the point in one graph and at this time the pointer on the other carriage is over the point of simultaneous strain on the other graph. Accordingly the strains in tension-compression and the simultaneous strains in torsion can be readily compared and studied.

It will be understood that the units of the extensometer can be employed separately to measure tension and compression alone or torsion alone. Likewise many of the features of the invention are retained even though the sleeves 43 and 24 are eliminated so that the friction bars 47 and 28 bear directly against the arm 30 and finger 13 respectively. Again the tension-compression unit herein described can be employed to determine torsional strains on a drill pipe or like member, and in this case the unit is mounted upon the pipe or member at right angles to the axis thereof. Similarly the torsion unit can be employed to measure tension-compression strains. All of the parts of the extensometer are made as light as possible so that centrifugal force, inertia and the like are reduced to a minimum.

While the invention has been illustrated and described as being employed in conjunction with rotary drill pipe, it should be appreciated that the extensometer of the present invention is applicable to use in testing and recording the stresses in various members other than drill pipe. Because of its rugged yet delicate construction it can be relied on to record the strains and stresses to which moving machine parts are subjected in use. It can be used to determine varying stresses on bridge or like structural members when subjected to change in loads and many other uses will suggest themselves.

A particularly advantageous feature of the invention is that the recording element is not rapidly used up due to the construction of the instrument wherein substantially only strains above a predetermined minimum and/or a combination of strains are recorded. Thus the really important strains such as may cause failure can be measured over a substantial period of time upon a relatively small target in an instrument of such a small size that it can be readily attached to most members when in use.

The term "strain cycles" as employed in the claims means any cycles or series of strains as encountered by a member in use over a given time. Specifically, strain cycles of an oil well drill string are the series or cycles of strains to which the string is subjected in use during a predetermined time, as for example, one hour of drilling.

Although in accordance with the patent statutes one embodiment of the invention has been illustrated and described in detail, it should be understood that the invention is not limited thereto or thereby, but is defined in the appended claims.

I claim:

1. In combination, a test member, a tension-compression recording unit secured to the member and including an angularly movable finger and a record receiving element for recording the movement of the finger, a torsion recording unit secured to the member and including an angularly movable arm likewise engaging with the record receiving element, and means linking the arm and finger for coordinated movement.

2. In combination, a member adapted to be subjected in use to a series of strains, an extensometer mounted on the member in use and comprising a base fastened on the member, a finger mounted on the base and extending over the member, a table secured to the member at a point remote from the base and positioned beneath approximately the opposite end of the finger, a record receiving element removably carried by the table, means resiliently tending to urge the finger in angular movement across the record receiving element, scratching means carried by the finger and engaging with the record receiving element, an element slidably mounted relative to the finger, abutments on the finger limiting the movement of the element, and friction means on the table engaging with the element and holding it stationary until the strain on the member moves a finger abutment against and picks up the element.

3. An extensometer comprising a finger, means constructed and arranged to swingably secure the finger to the specimen tested, a record receiving element constructed and arranged to be secured to the specimen at a point spaced from the swinging mounting of the finger but under the angularly moving portion of the finger, means on the finger for recording on the record receiving element the movement of the finger, a member mounted for limited sliding movement relative to the finger, frictional means for holding the member stationary relative to the record receiving element within the limits of the sliding movement of the member relative to the finger, and means tending to swing the finger across the record receiving element.

WILLIAM D. SHIELDS.